Patented Apr. 6, 1954

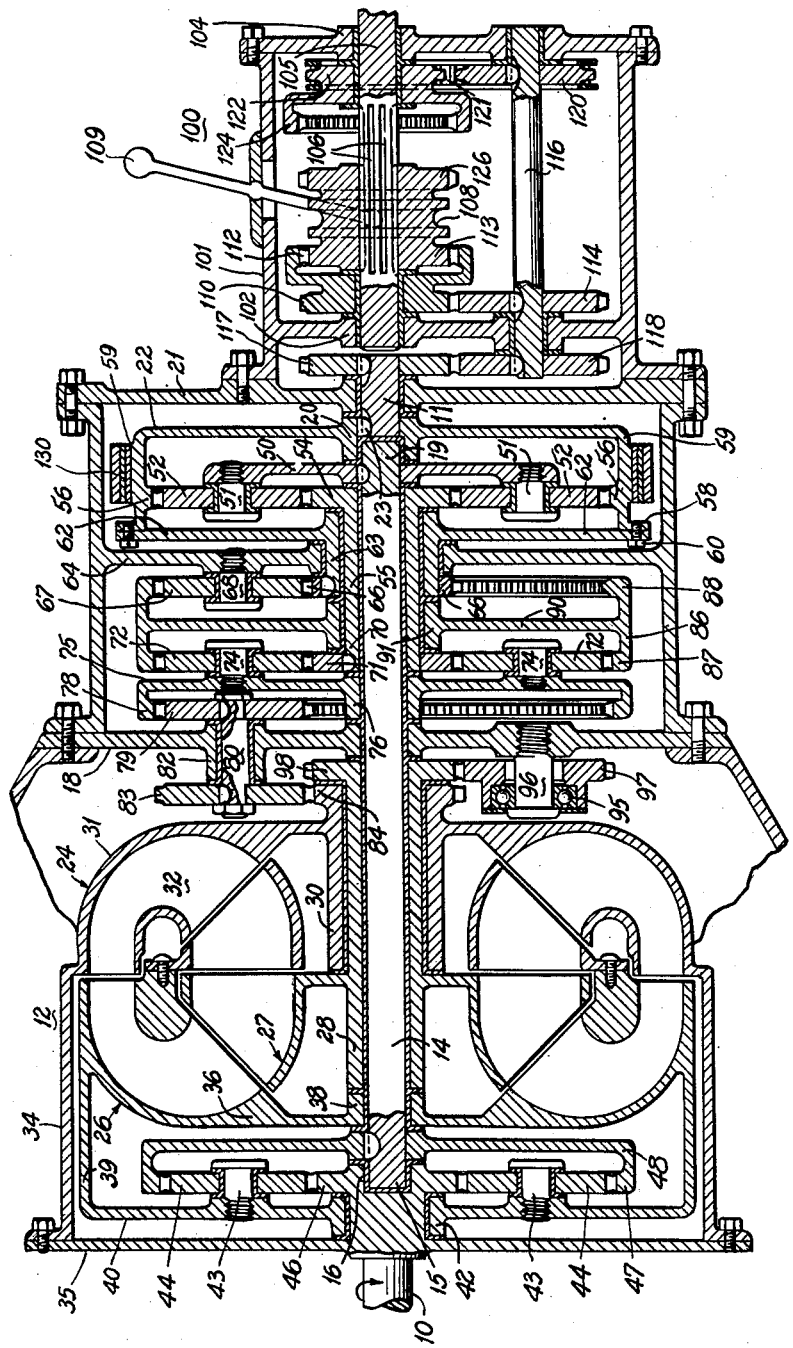

2,674,137

UNITED STATES PATENT OFFICE 2,674,137

POWER-TRANSMISSION OF TURBO-MECHANICAL TYPE

Charles I. Place, Norfolk, Conn.

Application May 29, 1950, Serial No. 164,932

9 Claims. (Cl. 74—688)

This invention relates to improvements in power transmissions of turbo-mechanical type, and more particularly to a fully automatic, variable transmission of step-less character, capable of a wide variety of applications, but suitable in particular for use in automotive vehicles and the like.

The presently improved turbo-mechanical transmission embodies differential gearing including at least two mutually cooperative gear trains between power input and output members or shafts, and a fluid turbine having its impeller in operative connection with one of the gear trains and in driven connection with the power input shaft, and the turbine output in planet-gear connection with the power input shaft and an element of the other gear train. The novel arrangement of the turbine and gearing is such as to provide at least two lines of power transmission between the input and output shafts, cooperative to produce a resultant speed and torque drive of the driven shaft, wherein the speed and torque of the output shaft varies automatically and smoothly in step-less manner, in response to variations in power application to the input shaft and to changes in loading of the output shaft.

Objectively stated, one of the principal purposes of the present invention is to provide a fully automatic transmission affording a step-less character of speed and torque variation produced solely as a result of changes in power input to the transmission and loading of the transmission output, thereby avoiding such gear-ratio and other control mechanism necessary to the operation of earlier transmissions, as gear-shift provisions, brakes and other operator-actuated controls for rendering elements of the transmission operative or inoperative to effect speed and torque changes in the transmission.

Another object of the present invention is to provide an automatic transmission which develops throughout normal transmission operation, a speed and torque drive balancing the power input to the transmission and the load imposed on the latter, the transmission operating automatically upon every variation in the power input, the imposed load, or both, to establish a drive balance appropriate to the changed conditions.

A further important object is to provide an automatic transmission of the character aforesaid, which is operative to produce overdrive of the output shaft relative to the input shaft, the overdrive being effected automatically and under minimum torque requirement of the output shaft, and occurring as a normal function of the presently improved transmission gearing, without requirement of such control facilities as are necessary to overdrive operation of earlier forms of so-called automatic transmissions.

Yet another object is to provide a fully automatic transmission having operating characteristics as hereinabove noted, wherein the transmission is composed of a desirable minimum number of elements, and presents a gearing and turbine arrangement capable of compact assembly.

Other objects and advantages of the invention will appear readily upon consideration of an exemplary embodiment hereinafter described with reference to the accompanying drawing, the single figure of which is a longitudinal sectional elevation of the improved transmission.

Referring now to the drawing, which illustrates a presently preferred transmission assembly of improved character according to the present invention, the transmission shown includes a driving or power input shaft 10, driven or power output shaft 11, and a fluid turbine 12 and differential gearing hereinafter to be described, interconnecting the input and output shafts. Preferably the shafts 10 and 11 are substantially in axial alignment, and extending axially therebetween and centrally through the transmission assembly, is a shaft 14. The end 15 of shaft 14 is rotatably journalled in a suitable recess in the end 16 of input shaft 10, while the shaft is further rotatably supported in a bearing in the transmission frame plate 18, and has its opposite end 19 journalled in the hub 20 of a drum-like member 22. The hub 20 of member 22 is mounted on the output shaft 11 and connected thereto, as by the key element 23, while the output shaft 11 is journalled in a bearing in the casing wall 21, as shown.

The shaft 14 provides an operative support for the fluid turbine 12 which may be of well known type suitable to the present transmission, the turbine as here shown comprising a driving or impeller structure 24, a driven structure 26 and a reactor 27, the reactor including a hub 28 sleeved on and rotatable relative to shaft 14. Impeller structure 24 provides an axially extended hub 30 freely journalled on the reactor hub 28, and a casing 31 within which are the impeller blades 32, the casing providing an extension 34 at its open side to which is secured a closure plate 35 carried by the input shaft 10. The plate 35 and casing 31 rotate with shaft 10, and hence form the drive connection between shaft 10 and the impellers 32. Driven structure 26 of the turbine includes a frame or casing 36 having a hub 38 journalled on shaft 14, and a casing extension 39 providing a spider or planet-carrier 40 having a hub 42 journalled on the input shaft end portion 16. Spider 40 supports stub shaft elements 43 on which are rotatably mounted the planet gears 44. Engaging the planet gears 44 are a sun gear 46 fixed to or formed as a part of the end 16 of input shaft 10, and an internal ring gear 47 rotatable with shaft 14 through the ring gear spider 48 keyed or otherwise secured to the shaft as shown. The turbine casing 31 and its extension 34, together with the closure plate 35, provide an enclosure within which is a body of fluid such as oil, (not shown), in volume sufficient for the operation of the turbine.

Suitably secured to or keyed on the end 19 of shaft 14, is a spider or planet-carrier 50 supporting stub shaft elements 51 on which rotate planet gears 52. Planet gears 52 engage a sun gear 54 on or integral with one end of a tubular member 55 rotatably sleeved on shaft 14, and also engage an internal ring gear 56 carried by the drum-like member 22 connected to the output shaft 11. Secured to the flange 58 on the rim 59 of member 22, as by bolts 60, is a plate or spider member 62 having a tubular hub 63 rotatably sleeved on the tubular member 55 and further rotatably supported in a bearing in gear casing frame plate 64. Keyed to hub 63 is a sun gear 66 which engages a gear 67 freely rotatable on a stub shaft 68 fixed to the frame plate 64, as shown. Similarly keyed or otherwise secured to the end 70 of sleeve member 55, is a sun gear 71, the latter enmeshing planet gears 72 rotatable on stub shafts 74 supported by a planet-carrier or spider 75. The spider 75 which through its hub 76, is freely rotatably supported on shaft 14, includes a lateral annular projection at its periphery, providing an internal ring gear 78. Engaging the ring gear 78 is a gear 79 keyed to a stub shaft 80, the stub shaft being journalled in and projecting through a bearing portion 82 on frame plate 18. Fixed or keyed to the opposite end of the stub shaft 80, is a gear element 83 which enmeshes a sun gear 84 secured to or formed on the supporting hub 30 of the turbine impeller structure. Completing the differential gearing as above described, is a double internal ring gear member 86 providing ring gear 87 enmeshing the planet gears 72, and a ring gear 88 enmeshing the gear 67. Member 86 includes a central spider support 90 having a hub 91 freely rotatably supported on the sleeve member 55.

Control of the turbine reactor 27 such as to prevent reverse rotation thereof during operation of the turbine as a torque-converter, and to permit the reactor to float with the impeller and driven members of the turbine when the turbine acts as a coupling, is here accomplished by a uni-directional brake 95 operatively supported on a stub shaft 96 fixed to frame plate 18 and connected to the reactor through a gear 97 engaging a sun gear 98 on the sleeve-hub 28 of the reactor. The uni-directional brake may be of well known form, and is arranged so that its locking action to prevent reverse rotation of the reactor as above indicated, is in proper relation to the normal intended direction of turbine rotation.

Turning now to the operation of the transmission, to facilitate an understanding thereof, let it be assumed that in the embodiment illustrated, the gear ratios are as follows: A gear ratio of one to one obtains between the sun gears 46, 54, 71 and their respective planet gears 44, 52, 72; between sun gear 66 and gear 67, and between sun gear 84 and gear 83. Further, a gear ratio of one to three obtains in respect to the planet gears 44, 52, 72 and their respective internal ring gears 47, 56, 87; between gear 67 and ring gear 88, and between gear 79 and ring gear 78. Let it be assumed moreover, that the input shaft 10 is driven from a power source such as an internal combustion engine, having a relatively wide speed range, as from say a low or idling speed of 1200 R. P. M. through a normal operating speed of about 2400 R. P. M. and that the output shaft is connected to a load, as the driving wheels of an automotive vehicle. Now, with the engine idling and rotating the transmission input shaft 10 at 1200 R. P. M., in the clockwise direction as shown by the arrow in the figure, and with the output shaft 11 at rest under load, it will be observed that sun gear 84 rotating clockwise at 1200 R. P. M., turns the gear 83 and hence gear 79, at the same speed but in the counter-clockwise direction. For convenience in the following description, the abbreviation cw. will be employed to denote clockwise rotation and ccw. to denote counter-clockwise rotation.

Gear 79 turning ccw. at 1200 R. P. M. as above indicated, drives the ring gear 78 ccw. at one-third the speed of the gear 79 (under the assumed gear ratios), or at 400 R. P. M., and since ring gear 78 is on planet carrier 75, the latter carrying the planet gears 72, will have the same speed ccw. Planet gears 72 being in mesh with ring gear 87 and sun gear 71, it will appear in view of the assumed gear ratios, that with ring gear 87 at rest, the sun gear 71 will be rotated by planet gears 72 at four times the speed of carrier 75, or at 1600 R. P. M. and ccw. Conversely, with sun gear 71 at rest, the planet gears 72 will rotate ring gear 87 at one and one-third the speed of carrier 75 and ccw. In respect to the latter condition, it will appear further, that should the ring gear 87 be driven by other than the planet gears at the indicated speed of one and one-third that of the carrier 75, the sun gear 71 will remain at rest.

Since in the example under present discussion, the output shaft 11 is at rest under load, the connected ring gear 56 and sun gear 66 will be at rest. It follows then, that gear 67 on fixed shaft 68 and enmeshing sun gear 66 and ring gear 88, will remain at rest and hence retain ring gear 88 at rest. Therefore, since ring gear 87 is on a common carrier with ring gear 88, it will be at rest, thereby establishing the ccw. drive of sun gear 71 by the planet gears 72 at four times the speed of carrier 75, or at 1600 R. P. M. Now, since sun gear 54 rotates with sun gear 71 and the ring gear 56 is at rest, the sun gear 54 drives the planet gears 52, and the latter acting through the stationary ring gear 56 as a fulcrum, produce ccw. rotation of the carrier 50 at a speed one-fourth that of the sun gear 54, or at 400 R. P. M. Carrier 50 being keyed to shaft 14, rotates the latter at the same speed, with the result that the ring gear 47 also fixed to shaft 14, rotates ccw. at 400 R. P. M. Therefore, since sun gear 46 on input shaft 10 is rotating cw. at 1200 R. P. M., the planet gears 44 between sun gear 46 and ring gear 47 will revolve on their axes (shaft elements 43) without producing any rotation of the carrier 40. Hence, under these conditions the carrier 40 and the connected turbine driven structure 26 will remain at rest. At such time, the turbine impellers 32 although rotating with the input shaft at the indicated idling speed, are not rotating fast enough to cause displacement of the turbine driven structure from its at rest condition imposed by the operation of the transmission gearing as above described, with the output shaft at rest under a load of sufficient proportions to hold the turbine driven member against rotation with the turbine driving member.

Where the present transmission is provided in capacity suited to the engine power plant and normal expected driving load requirements of a given automotive vehicle, for example, the load imposed on the transmission output through connection thereof with the vehicle drive wheels when the vehicle is at rest, is sufficient at engine idling speed to hold the turbine driven member against rotation. Consequently, the vehicle will remain at rest even though the vehicle drive wheels are connected to the engine output shaft through the transmission. Removal of the load, as by disconnection of the transmission output from the vehicle drive wheels will, of course, free the turbine driven member for rotation with the turbine driving member under the idling speed condition.

Therefore, in such installations of the transmission which provide for connection and disconnection of the load relative to the transmission output shaft, suitable provision should be made for restraining the output shaft against rotation when load connection is made to the transmission, in order to avoid shock to the mechanism which would occur otherwise, were the connection made to the transmission output shaft while it is rotating. A provision for this purpose is embodied in the present transmission, and such will be described hereinafter.

Upon acceleration of the engine toward the indicated normal operating speed of 2400 R. P. M., the transmission functions in the following manner. As acceleration takes place, the fluid turbine becomes effective as a torque converter with fluid drive of the turbine driven structure 26 aided by the reverse flow produced by the reactor 27 then constrained against reverse rotation by the one-way brake 95. With rotation of the turbine structure 26, the carrier 40 rotating therewith will cause the planet gears 44 acting through the sun gear 46 as a fulcrum, to drive the ring gear 47. Since under the idling condition, the ring gear 47 rotates ccw., it will be apparent that with cw. rotation of sun gear 46 and cw. acceleration of the carrier 40, the ring gear 47 will decelerate to zero speed and thence accelerate in the clockwise direction. The planet gear carrier 50 at the output side of the transmission, being connected to the shaft 14 to which the ring gear 47 is connected, will follow exactly the deceleration and acceleration displacements of ring gear 47, and its effect through the planet gears 52, on the output shaft 11 will be described presently. However, it is to be noted here that the above described combined engine and turbine drive of the carrier 50 constitutes one line of power transmission in the presently improved transmission assembly.

Cooperating with the power drive hereinabove described, is a second combined drive involving the sun gear 84 driven from the input shaft 10 through the turbine casing 31, and the sun gear 66 connected through the drumlike member 22, to the output shaft 11. As before indicated in the description of the idling speed condition of the transmission wherein the output shaft 11 and hence the ring gear 56, is at rest under load, the sun gear 54 is driven at one and one-third the speed of the input shaft 10, and drives the planet gear carrier 50 (through planet gears 52) at a speed which is one-quarter of that of sun gear 54. So long as the turbine driven structure 26 remains at rest, that speed relationship of the transmission elements above mentioned, will obtain at any speed of the input shaft 10. But as the turbine driven structure accelerates from rest, resulting in a deceleration of the carrier 50 to zero speed and thence acceleration in reverse rotation as indicated hereinbefore, the sun gear 54 becomes effective through the planet gears 52 on carrier 50, to drive the ring gear 56. When the speed of the carrier 50 is zero, the speed of the ring gear 56 is one-third the speed of sun gear 54 and cw. because of the ccw. rotation of the sun gear. Therefore, the direction of rotation of the output shaft 11 to which the ring gear is connected, is cw.

Rotating cw. with the output shaft is the sun gear 66, and because of the fixed axis of the gear 67 connecting the sun gear 66 and the ring gear 88 of the double ring gear unit 86, the gear 66 produces ccw. rotation of the double ring gear unit 86 at a speed one-third that of the sun gear 66. Now the sun gear 84 rotating at the speed of the input shaft 10 and driving the gear 83 and hence gear 79, ccw. at the same speed, effects through gear 79, ccw. drive of ring gear 78 and the carrier 75 at one-third input speed. As before indicated, when ring gear unit 86 is at rest, the planet gears 72 on carrier 75 drive the sun gear 71 ccw. at four times the speed of the carrier 75. Therefore, upon ccw. rotation of the double ring gear unit 86, the sun gear 71 and hence the sun gear 54, will be caused to decelerate toward zero speed, the sun gear 54 here constituting the effective output or terminal element of the second line of power transmission in the present assembly.

From the foregoing, it will appear that upon increase in speed of the input shaft 10 from its idling speed, the first line of power transmission through the assembly produces initially a progressive decrease in the speed of rotation of planet carrier 50, and thence a progressive increase in the speed thereof in the cw. direction. Coincidentally therewith, the second line of power transmission produces a progressive decrease in the speed of the sun gear 54. The two lines of transmission thus cooperate through the coaction of the sun gear 54 and the planet gears 52 on carrier 50, to effect a resultant cw. drive of the ring gear 56 and hence, cw. drive of the output shaft 11. Moreover, the extent and rate of speed change in respect to the speeds of carrier 50 and sun gear 54 during input shaft acceleration, will depend upon the loading of the output shaft 11, being greater with decreasing loading, and less with increasing loading.

Upon deceleration of the input shaft, the reverse of the above takes place and here again, the rate and extent of speed change in the sun gear 54 and the carrier 50 depend on the loading. It will appear now also, that with a constant given speed of the input shaft, any change in the load imposed on the output shaft 11 will cause the transmission mechanism to operate in the above indicated manner. While transmitting power from the input shaft 10 to the output shaft 11, the operation of the transmission as indicated in the several examples hereinabove, adjusts the relative cooperation of the two lines of power flow through the transmission, to the altered conditions at the input shaft or the output shaft, or both. Assuming normal operation of the transmission system within its load capacity, such adjustments serve to effect a balanced drive, providing a speed and torque output matching the requirements of the load imposed on the output shaft of the transmission. In all cases, the transmission adjustments occur smoothly and in step-less manner.

Accordingly, it will be now appreciated that the present transmission assembly affords a power drive connection between a source of power such as an internal combustion engine, and a load to be driven, wherein the turbomechanical gearing arrangement thereof is effective automatically without the aid of external controls, to produce an operating balance between the input torque and the load imposed on the transmission output shaft. Upon any change in the speed and torque of the input shaft 10 and/or in the load imposed on the output shaft 11, the transmission gearing responds by corresponding relative adjustments of the cooperating lines of power flow therein, to attain such balanced drive.

An important feature of the present transmission is the over-drive function thereof. With the gear ratios assumed in the example hereinabove described, it will be evident that when the planet gear carrier 50 attains a speed equal to the speed of the input shaft 10, and the sun gear 54 reaches zero speed, the speed of the ring gear 56 and hence of the output shaft 11, becomes one and one-third that of the input shaft speed. This obviously, is of great advantage where the transmission is employed in automotive vehicles. Moreover, it is now apparent that the speed and torque characteristics of the presently improved transmission, as well as the extent of overdrive thereof, may be determined through appropriate selection of gear ratios between the several sun and planet gear connections and between the planet gear and ring gear connections.

Since in the present transmission the output shaft 11 is constrained to a uni-directional rotation corresponding to the direction of input shaft rotation, as clockwise if the input shaft is driven clockwise, where drive reversal is desired or required as in automotive applications of the transmission, a suitable reverse gear unit may be employed between the transmission output shaft 11 and the load. Such a unit is shown in the drawing at 100, having its gear case 101 supported on the transmission case wall 21. Journalled at 102 and 104 in case 101 is a shaft 105 which extends outwardly therefrom for connection to the load (not shown). The shaft 105 in its length between the bearings 102 and 104, is provided with splines 106, and axially slidable on the shaft in engagement with the splines thereof, is a double gear 108. Displacement of the gear 108 is here controlled through a shifting lever 109 in operative connection with the gear. Freely rotatable on shaft 105 near bearing 102, is a gear unit providing a sun gear 110 and as internal gear 112, the latter adapted for engagement by gearing 113 on double gear 108 when the double gear is shifted toward gear 112. Constantly enmeshing the sun gear 110 is a gear 114 keyed or otherwise secured to a countershaft 116 rotatably supported in the casing 101 and driven from the transmission output shaft 11 through connected gears 117 and 118. The countershaft 116 further has secured thereon within the reverse gear case 101, a sprocket 120 which is connected by a chain 121 to a similar sprocket 122 on a gear unit freely rotatably carried on the shaft 105 near bearing 104, the gear unit providing the internal gear 124 engageable by the gear 126 on the slide gear unit 108.

With the reverse gear provided as above described, it will be apparent that by shifting the gear unit 108 to engage its gear 113 with internal gear 112, the resulting drive of shaft 105 from the transmission output shaft 11 will be in the direction corresponding to the direction of rotation of shaft 11. On the other hand, shifting the gear unit 108 to engage its gear 126 with internal gear 124, will produce rotation of the shaft 105 in the reverse direction, while placement of the slide gear 108 out of engagement with either of the internal gears, determines the neutral condition of the reversing gear. While a manually operated gear shift lever 109 is here illustrated, it will be appreciated that the reversing gear unit 108 may be actuated through power means such as hydraulic or pneumatic servomotor mechanism, solenoids, or the like.

In the present transmission including the reverse gear unit 100, when the latter is in neutral and the input shaft 10 is driven at any speed, say idling speed, the output shaft 11 will rotate correspondingly, since there is no load on the latter shaft. Therefore, because the countershaft 116 is at all times in driven connection with the shaft 11 and, when rotating, produces rotation of the internal gears 112 and 124, shifting of the gear unit 108 to engage either gear 112 or 124 will result in gear clashing. Forcing of the gear connection in the reverse gear unit then would tend to subject the transmission to shock and possible damage. In order to avoid such gear clashing and shock, the countershaft 116 is here constrained against rotation while the reverse gear is shifted from neutral to forward or reverse drive conditions. As presently indicated, such restraint of the countershaft may be effected through the connected output shaft 11 and drum-like member 22 of the transmission, as by employing a suitable braking device or brake band 130 in application to the periphery of member 22. Actuation of the brake band 130 may be effected through any suitable control means (not shown), operable by the vehicle operator either directly or through the agency of say the service brakes of the vehicle. In any case, braking through band 130 should be utilized only when the vehicle is substantially at rest and the transmission input shaft 10 is rotating at idling or a relatively low speed.

Having now described and illustrated a presently preferred embodiment of my invention, what I desire to claim and secure by Letters Patent is:

1. A transmission interconnecting driving and driven shafts, comprising a fluid turbine having driving and driven members, means connecting the turbine driving member to the driving shaft, differential gearing including a gear train connected to the turbine driving member and terminating in a sun gear, a gear element carried on and operated by the driving shaft, said differential gearing providing a second gear train connected to said gear element and additionally connected to the turbine driven member, whereby the power input to the second gear train is realized directly from the driving shaft through said gear element, and is further realized from the turbine driven member, the second gear train terminating in planet gear means operatively engaging said sun gear, and means including a ring gear engaging said planet gear means, operatively connecting the differential gearing to the driven shaft.

2. A transmission interconnecting driving and driven shafts, comprising differential gearing providing a terminal gear connected to the driven shaft and including a shaft element arranged longitudinally of the transmission, a fluid turbine having driving and driven members rotatably carried on said shaft element, an operative connection between the driving shaft and the turbine driving member, means connecting the turbine driving member to a gear element of the differential gearing, a sun gear carried on and operated by the driving shaft, a ring gear mounted on said shaft element for rotation therewith and constituting an element of said differential gearing, and planet gear means connected to the turbine driven member and operatively engaging said sun gear and said ring gear.

3. A transmission interconnecting driving and driven shafts, comprising differential gearing connected to the driven shaft and including a shaft element arranged longitudinally of the transmission, a fluid turbine having driving and driven members and a reactor all rotatably carried on said shaft element, an operative connection between the driving shaft and the turbine driving member, means connecting the turbine driving member to a gear element of said differential gearing, a sun gear carried on and operated by the driving shaft, a ring gear connected to said shaft element and constituting an element of the differential gearing, planet gear means connected to the turbine driven member and engaging said sun gear and ring gear, and means constraining said turbine reactor to a unidirectional rotation in the operation of the turbine.

4. A transmission interconnecting driving and driven shafts, comprising differential gearing including a shaft element arranged longitudinally of the transmission, a fluid turbine having driving and driven members rotatably supported by said shaft element, means operatively connecting the driving shaft and turbine driving member, a gear element rotatable on said shaft element, means connecting the turbine driving member to said gear element, a sun gear operated by the driving shaft, a ring gear connected to said shaft element and constituting an element of the differential gearing, planet gear means connected to the turbine driven member and engaging said sun gear and ring gear, said differential gearing further including a sun gear rotatable on said shaft element, means operatively connecting the last said sun gear and said gear element, planet gear means engaging the last said sun gear and in operative connection with said shaft element, and means including ring gear in engagement with the last said planet gear means, operatively connecting the differential gearing to the driven shaft.

5. A transmission interconnecting driving and driven shafts, comprising a fluid turbine having driving and driven members; means connecting the turbine driving member and the driving shaft; a first gear train including a gear element rotatable with said turbine driving member, a rotary planet gear carrier having planet gears thereon, a ring gear on said planet gear carrier, gear means interconnecting said ring gear and said gear element, and a terminal gear in operative connection with said planet gears; a second gear train including a rotary planet gear carrier connected to said turbine driven member, planet gears on said carrier, gear means in engagement with said planet gears, a second planet gear carrier and planet gears thereon in engagement with said terminal gear in the first said gear train, and means operatively connecting said gear means and said second planet gear carrier; and a rotatable member connected to the driven shaft of the transmission and providing a ring gear in engagement with the planet gears on the second planet gear carrier in said second gear train.

6. A transmission as defined by claim 5, characterized further by a sun gear operated by the driving shaft of the transmission and engaging the planet gears of the first said planet gear carrier in said second gear train.

7. A transmission as defined by claim 5, characterized further by gear means interconnecting said planet gears of the first said gear train and said rotatable member connected to the driven shaft of the transmission.

8. A transmission interconnecting driving and driven shafts, comprising a rotary shaft element arranged longitudinally in the transmission, a fluid turbine having driving and driven members rotatably supported on said shaft element, means operatively connecting the driving shaft and the turbine driving member, a sun gear driven by the driving shaft, a ring gear fixed on said shaft element, planet gear means connected to the turbine driven member and having the planet gears thereof in engagement with said sun gear and ring gear, a sun gear driven by the turbine driving member, a ring gear rotatable on said shaft element, gear means interconnecting the last said sun and ring gears, planet gears operatively carried on the last said ring gear, a tubular member rotatably sleeved on said shaft element, a sun gear fixed on said member and engaging the last said planet gears, a second sun gear fixed on said member, a gear member connected to the driven shaft of the transmission, and a planet gear carrier secured on said shaft element and supporting planet gears in engagement with said gear member and said second sun gear.

9. A transmission according to claim 8, characterized further by a gear element rotatable on a fixed axis, gear means connecting said gear element and the said gear member connected to the driven shaft of the transmission, and a double ring gear member rotatably supported on the said tubular member and having one ring gear thereof in engagement with said gear element, and the other ring gear thereof in engagement with the planet gears which are operatively carried on said ring gear rotatable on said shaft element.

References Cited in the file of this patent

UNITED STATES PATENTS

| Number | Name | Date |
|---|---|---|
| Re. 22,466 | Pollard | Apr. 4, 1944 |
| 2,196,585 | Gette | Apr. 9, 1940 |
| 2,431,318 | Ellis | Nov. 25, 1947 |
| 2,523,619 | Grebb | Sept. 26, 1950 |

FOREIGN PATENTS

| Number | Country | Date |
|---|---|---|
| 218,243 | Switzerland | Mar. 16, 1942 |
| 384,816 | Great Britain | Dec. 15, 1932 |
| 412,231 | Great Britain | June 22, 1934 |